US010515521B2

(12) United States Patent
Klein et al.

(10) Patent No.: US 10,515,521 B2
(45) Date of Patent: Dec. 24, 2019

(54) METHODS AND APPARATUS FOR SECURING A TRACKING BEACON TO PERSONAL PROTECTION EQUIPMENT

(71) Applicant: W. W. Grainger, Inc., Lake Forest, IL (US)

(72) Inventors: Brice Klein, Chicago, IL (US); Alessia Serafino, Palatine, IL (US); David Koenig, Lake Forest, IL (US); Steve Martinez, Lake Forest, IL (US); Reena Patel, Lake Forest, IL (US)

(73) Assignee: W.W. Grainger, Inc., Lake Forest, IL (US)

( * ) Notice: Subject to any disclaimer, the term of this patent is extended or adjusted under 35 U.S.C. 154(b) by 0 days.

(21) Appl. No.: 15/353,470

(22) Filed: Nov. 16, 2016

(65) Prior Publication Data

US 2017/0140617 A1    May 18, 2017

Related U.S. Application Data

(60) Provisional application No. 62/256,010, filed on Nov. 16, 2015.

(51) Int. Cl.
| | | |
|---|---|---|
| *G08B 21/02* | (2006.01) | |
| *G08B 5/36* | (2006.01) | |
| *G06K 7/10* | (2006.01) | |
| *G08B 5/22* | (2006.01) | |
| *G08B 6/00* | (2006.01) | |

(52) U.S. Cl.
CPC ........... *G08B 5/36* (2013.01); *G06K 7/10366* (2013.01); *G08B 5/22* (2013.01); *G08B 6/00* (2013.01); *G08B 21/02* (2013.01)

(58) Field of Classification Search
CPC .............................. G08B 21/02; G06K 9/6215
USPC .... 340/539.13, 539.15, 539.23, 572.1–572.9
See application file for complete search history.

(56) References Cited

U.S. PATENT DOCUMENTS

| | | | | |
|---|---|---|---|---|
| 6,679,405 B2* | 1/2004 | Zalis-Hecker | ........... | A45C 1/04 150/107 |
| 7,489,242 B2* | 2/2009 | Hines | ................. | G08B 21/0227 340/568.1 |
| 7,607,243 B2* | 10/2009 | Berner, Jr. | ........... | A43B 3/0005 36/136 |

(Continued)

FOREIGN PATENT DOCUMENTS

GB        1000923 A       8/1965

OTHER PUBLICATIONS

ISA/US, International Search Report and Written Opinion issued on PCT application No. US16/62337, dated Jan. 24, 2017, 11 pages.

*Primary Examiner* — Phung Nguyen
(74) *Attorney, Agent, or Firm* — Greenberg Traurig, LLP

(57) ABSTRACT

This disclosure presents various means for securing a tracking beacon to personal protection equipment. The tracking beacon mount is constructed of a cover, a base, a transmitter and a mounting mechanism, such as a strap. The transmitter has a unique identifier which is detected by a proximity sensor. The proximity sensor is operably connected to a tracking system which can be used to detect the presence of the beacons. The system is programmed to recognize the types of items used and warn the user if something predetermined as required for the location or job type is missing.

5 Claims, 16 Drawing Sheets

(56) References Cited

U.S. PATENT DOCUMENTS

| | | | |
|---|---|---|---|
| 7,623,033 B2* | 11/2009 | Ainsworth | G06Q 10/08 |
| | | | 340/539.13 |
| 7,927,253 B2* | 4/2011 | Vincent | A63B 24/0021 |
| | | | 482/9 |
| 8,248,263 B2* | 8/2012 | Shervey | F16P 3/147 |
| | | | 340/539.1 |
| D693,248 S | 11/2013 | Anderssen et al. | |
| D693,249 S | 11/2013 | Anderssen et al. | |
| D715,667 S | 10/2014 | Shigeno et al. | |
| D717,680 S | 11/2014 | Park et al. | |
| D733,596 S | 7/2015 | Goodner et al. | |
| D736,107 S | 8/2015 | Lee | |
| D748,507 S | 2/2016 | Evans et al. | |
| D758,905 S | 6/2016 | Evans | |
| 9,456,063 B2* | 9/2016 | Mercando | H04M 1/7253 |
| D773,324 S | 12/2016 | Klein et al. | |
| 2004/0093897 A1 | 5/2004 | Weissbuch | |
| 2009/0008450 A1 | 1/2009 | Ebert et al. | |
| 2009/0051535 A1 | 2/2009 | Brenner | |
| 2011/0001722 A1 | 1/2011 | Newman et al. | |
| 2012/0200460 A1 | 8/2012 | Weed et al. | |
| 2013/0150028 A1 | 6/2013 | Akins et al. | |
| 2013/0214909 A1 | 8/2013 | Meijers et al. | |
| 2014/0002239 A1* | 1/2014 | Rayner | G08B 13/1427 |
| | | | 340/5.61 |

* cited by examiner

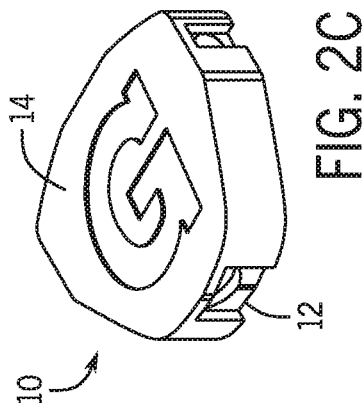
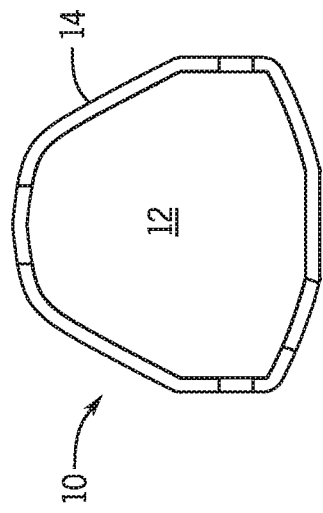
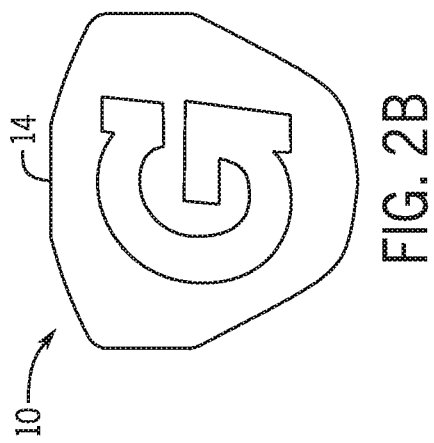
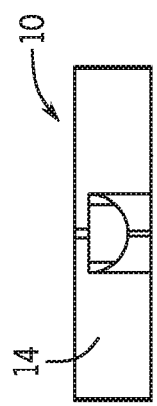
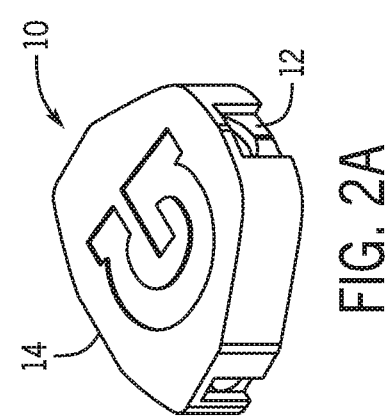

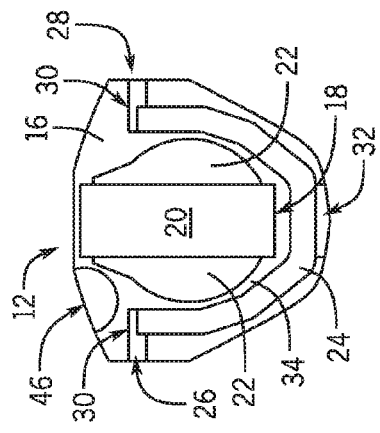
FIG. 3C
FIG. 3B
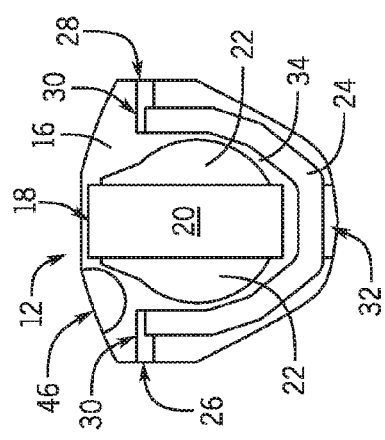
FIG. 3A
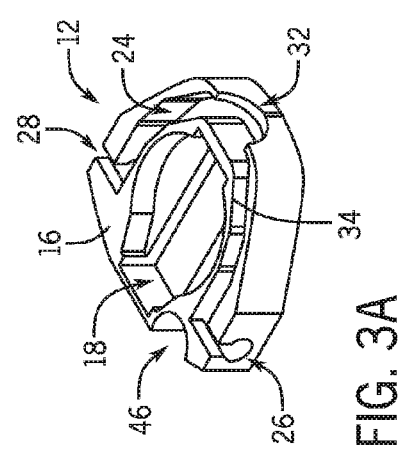
FIG. 3D
FIG. 3E
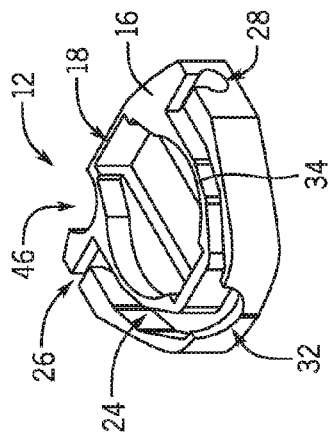
FIG. 3G
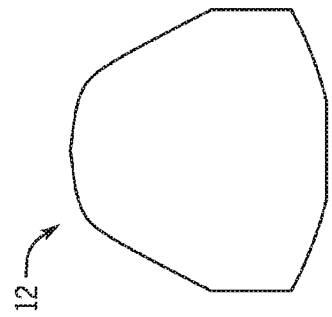
FIG. 3F
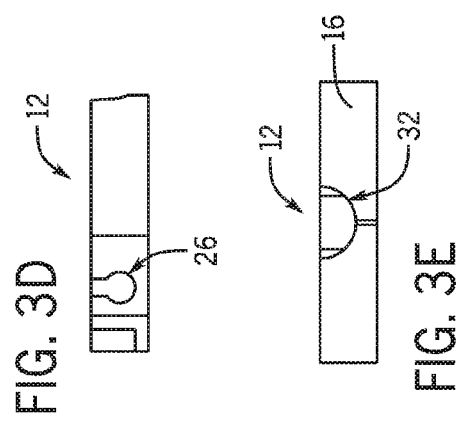

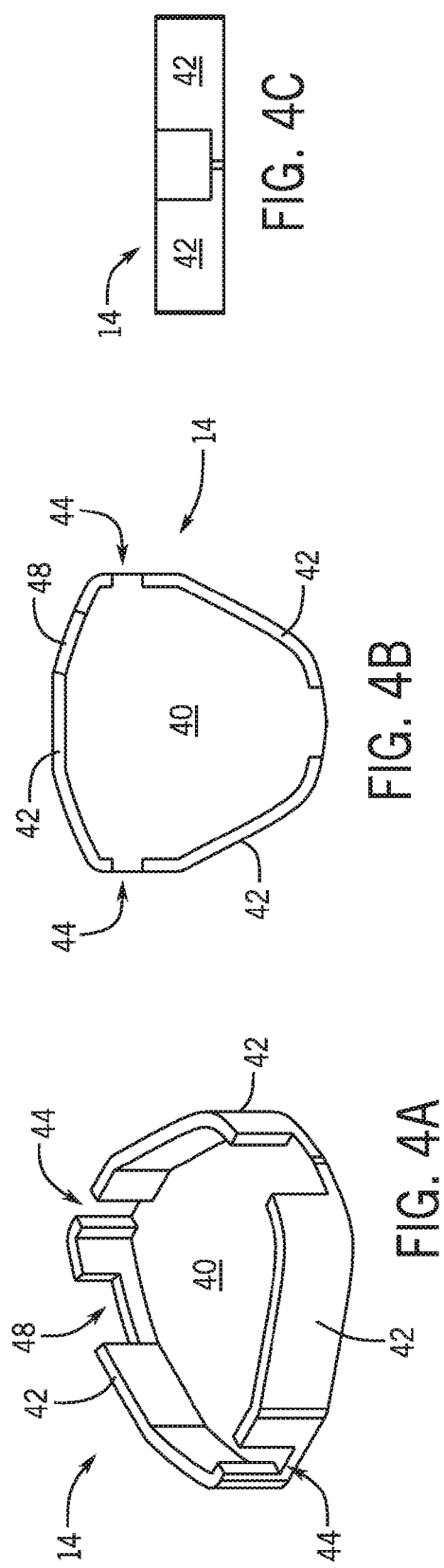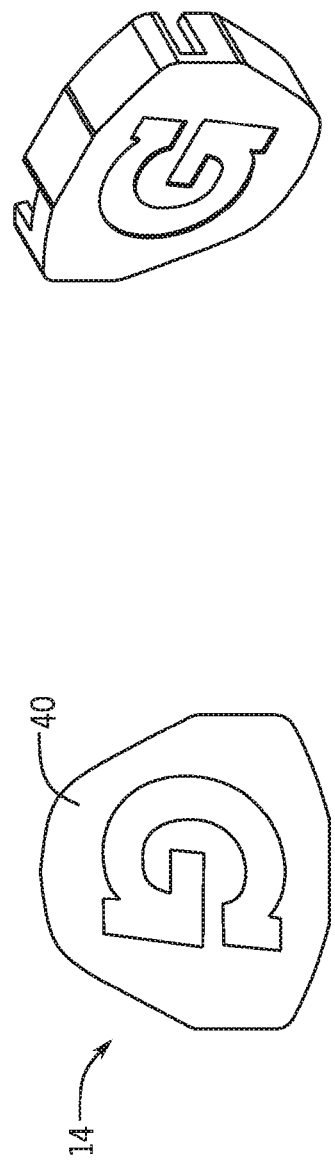
FIG. 4C
FIG. 4E
FIG. 4B
FIG. 4A
FIG. 4D

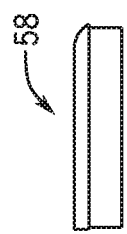
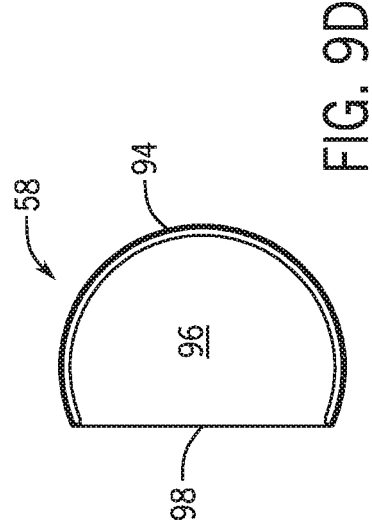
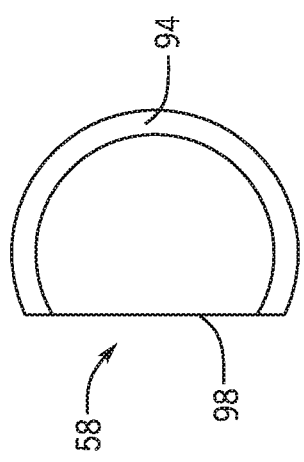
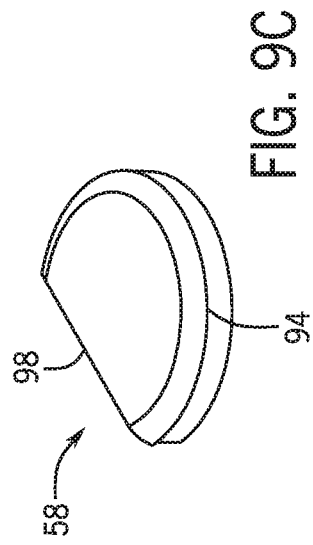

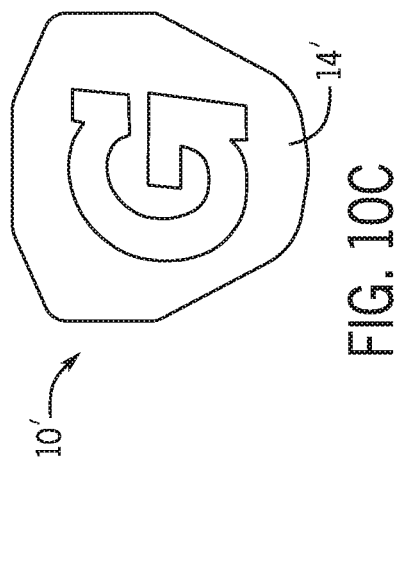
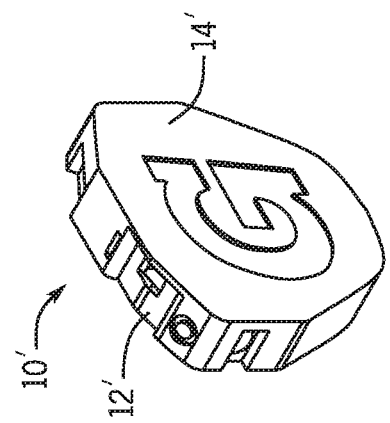
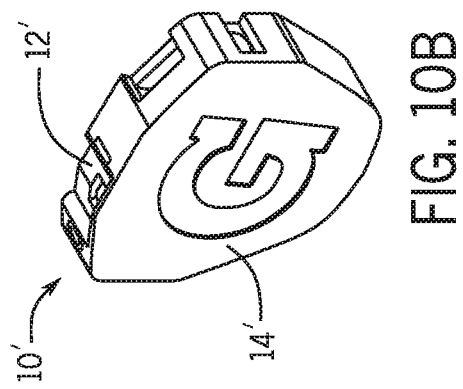
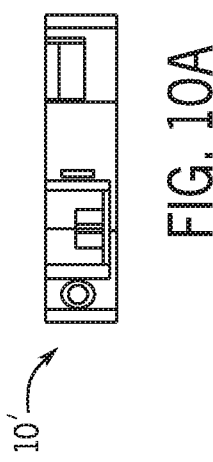
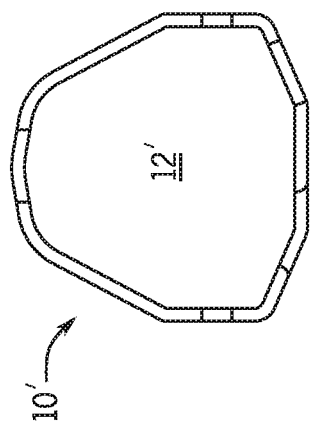

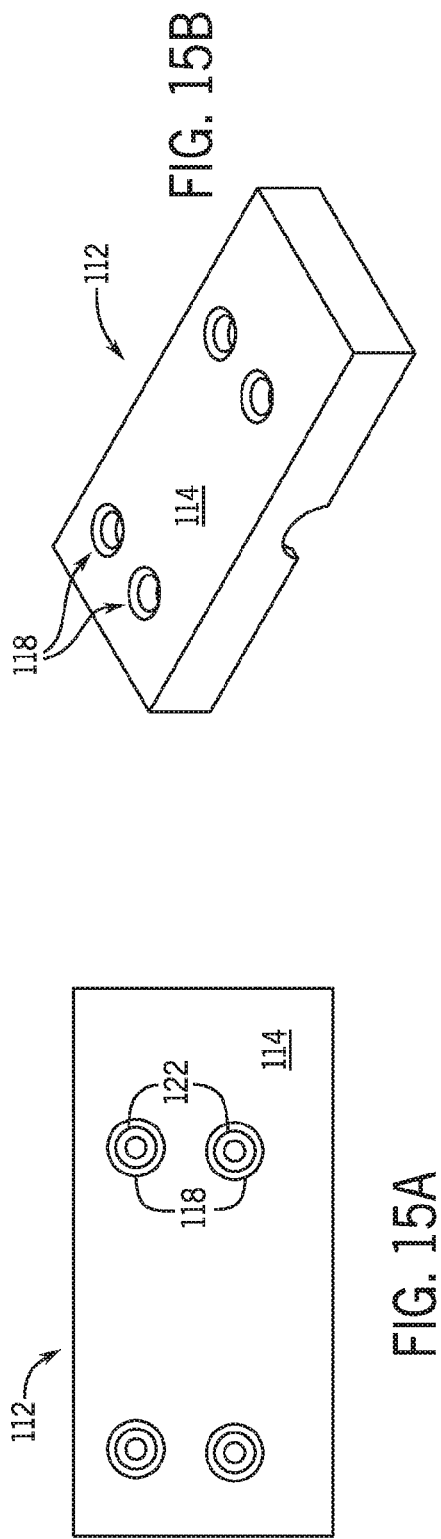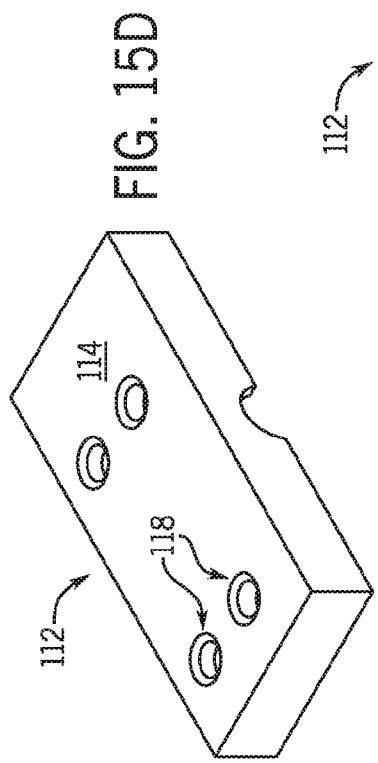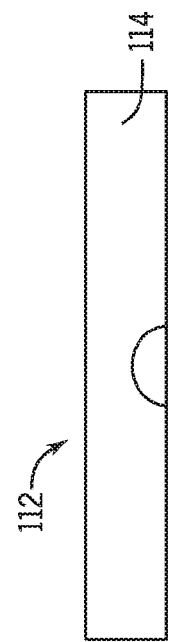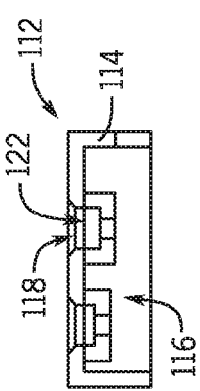

METHODS AND APPARATUS FOR SECURING A TRACKING BEACON TO PERSONAL PROTECTION EQUIPMENT

FIELD OF THE DISCLOSURE

The present disclosure relates generally to securing a tracking beacon to a desired object and, more particularly, to various methods and apparatus for securing a tracking beacon to personal protection equipment.

BACKGROUND OF RELATED ART

In various fields, personal protection equipment (PPE) is used to protect a user from environmental or other hazards. Such personal protection equipment can include safety goggles or glasses, boots, helmets, gloves, and the like. Because PPE is constantly worn by workers in many jobs and tasks, PPE location may be used as a proxy for worker location, and can be used to keep track of workers to ensure their safety. For example, in the event of an accident or impending issue at a worksite, laboratory, etc., knowledge of the location of PPE within an affected area can allow a worksite operator to quickly ascertain the number, identity, and specific locations of workers within the affected area to determine the best actions to ensure the safety of those workers. In addition, the workers themselves may use the beacons for a variety of safety and other functions.

Accordingly, there is an identifiable need to securely attach tracking beacons to personal protection equipment and other objects.

BRIEF DESCRIPTION OF THE DRAWINGS

FIG. 2A is an isometric view of a tracking beacon according to the present disclosure.

FIG. 2B is a top plan view of the tracking beacon of FIG. 2A.

FIG. 2C is another isometric view of the tracking beacon of FIG. 2A.

FIG. 2D is a right side elevated view of the tracking beacon of FIG. 2A.

FIG. 2E is a front elevated view of the tracking beacon of FIG. 2A.

FIG. 2F is a bottom plan view of the tracking beacon of FIG. 2A.

FIG. 3A is an isometric view of a tracking beacons according to the present disclosure.

FIG. 3B is a top plan view of the tracking beacon of FIG. 3A.

FIG. 3C is another top plan view of the tracking beacon of FIG. 3A.

FIG. 3D is a right side view of the tracking beacon of FIG. 3A.

FIG. 3E is a front view of the tracking beacon of FIG. 3A.

FIG. 3F is a bottom plan view of the tracking beacon of FIG. 3A.

FIG. 3G is another isometric view of the tracking beacon of FIG. 3A.

FIG. 4A is an isometric view of a tracking beacons according to the present disclosure.

FIG. 4B is a top plan view of the tracking beacon of FIG. 4A.

FIG. 4C is a bottom elevated view of the tracking beacon of FIG. 4A.

FIG. 4D is a top elevated view of the tracking beacon of FIG. 4A.

FIG. 4E is another isometric view of the tracking beacon of FIG. 4A.

FIG. 9A is a top view of a tracking beacon cover according to the present disclosure.

FIG. 9B is a side elevated view of the tracking beacon cover of FIG. 9A.

FIG. 9C is an isometric top view of the tracking beacon cover of FIG. 9A.

FIG. 9D is a bottom plan view of the tracking beacon cover of FIG. 9A.

FIG. 10A is a top plan view of a tracking beacon cover according to the present disclosure.

FIG. 10B is an isometric left view of the tracking beacon upper portion of FIG. 10A.

FIG. 10C is a side elevated view of the tracking beacon upper portion of FIG. 10A.

FIG. 10D is bottom plan view of the tracking beacon upper portion of FIG. 10A.

FIG. 10E is an isometric right view of the tracking beacons upper portion of FIG. 10A.

FIG. 15A is a top plan view of a tracking beacon charging rack according to the present disclosure.

FIG. 15B is a right isometric view of the tracking beacons charging rack of FIG. 15A.

FIG. 15C is a right side elevated view of the tracking beacon charging rack of FIG. 15A.

FIG. 15D is a left isometric view of the tracking beacon charging rack of FIG. 15A.

FIG. 15E is a front side elevated view of the tracking beacon charging rack of FIG. 15A.

DETAILED DESCRIPTION

The following description of example methods and apparatus is not intended to limit the scope of the description to the precise form or forms detailed herein. Instead the following description is intended to be illustrative so that others may follow its teachings.

Figure 1:
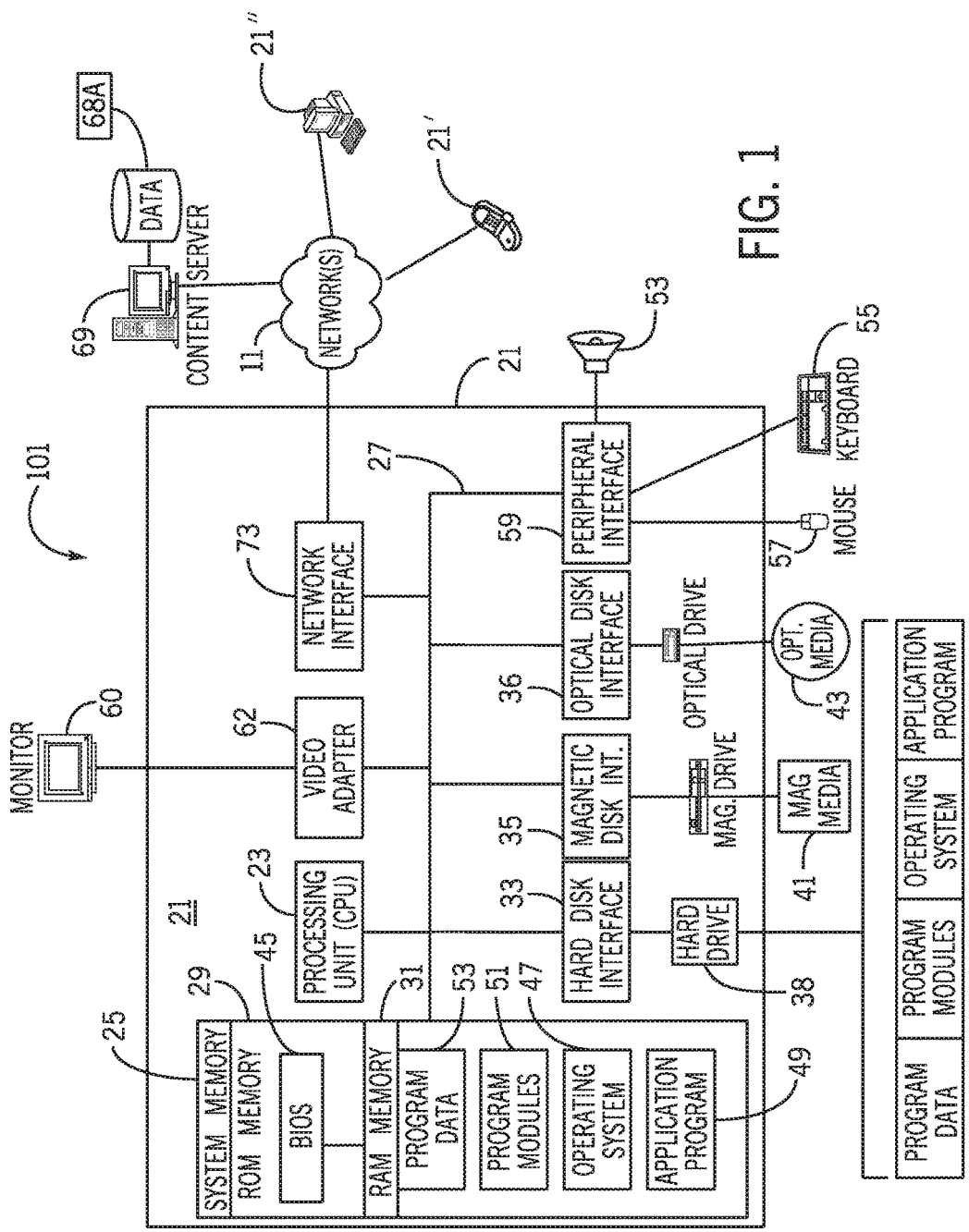
FIG. 1 is a block diagram illustrating components of an exemplary network system in which the systems and methods described hereinafter may be employed.
Figure 5B:
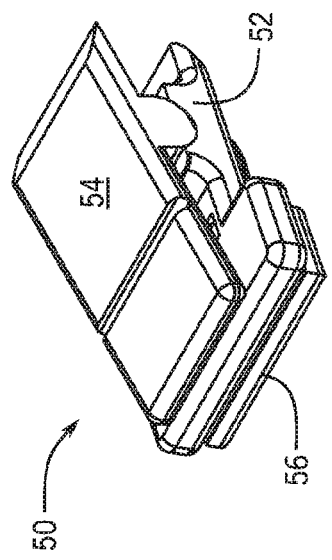
FIG. 5B is an isometric view of the tracking beacon of FIG. 5A.
Figure 5E:
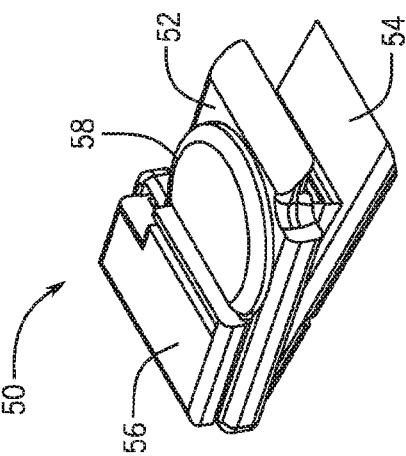
FIG. 5E is another isometric view of the tracking beacon of FIG. 5A.
Figure 5A:
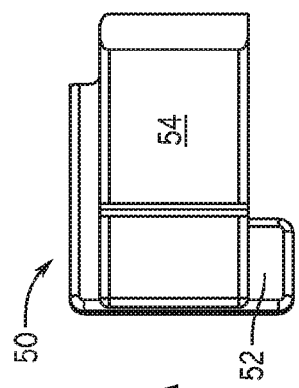
FIG. 5A is a top view of a tracking beacon according to the present disclosure.
Figure 5C:
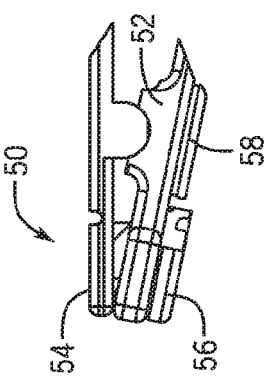
FIG. 5C is a side elevated of the tracking beacon of FIG. 5A.
Figure 5D:
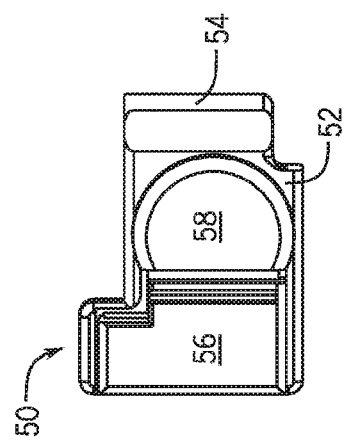
FIG. 5D is a bottom plan view of the tracking beacon of FIG. 5A.
Figure 6C:
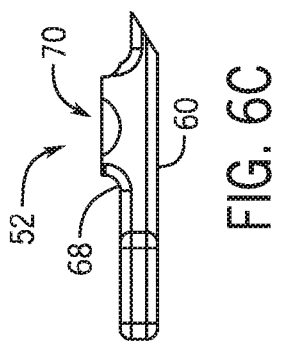
FIG. 6C is a side elevated view of the tracking beacon lower portion of FIG. 6A.
Figure 6B:
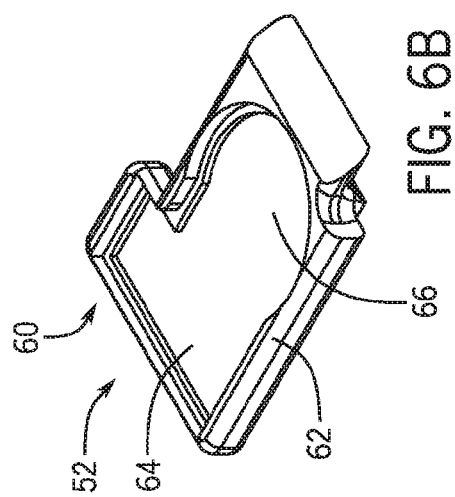
FIG. 6B is an isometric top view of the tracking beacon lower portion of FIG. 6A.
Figure 6E:
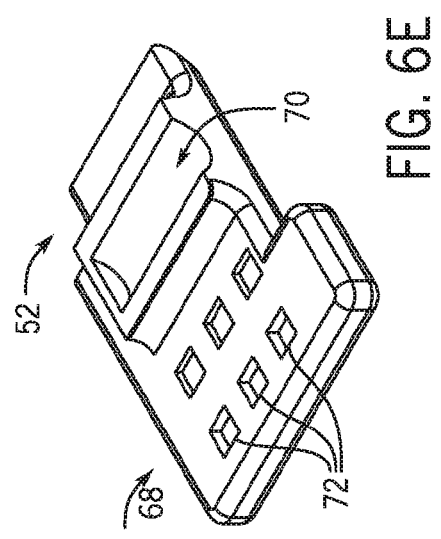
FIG. 6E is a bottom isometric view of the tracking beacons lower portion of FIG. 6A.
Figure 6A:
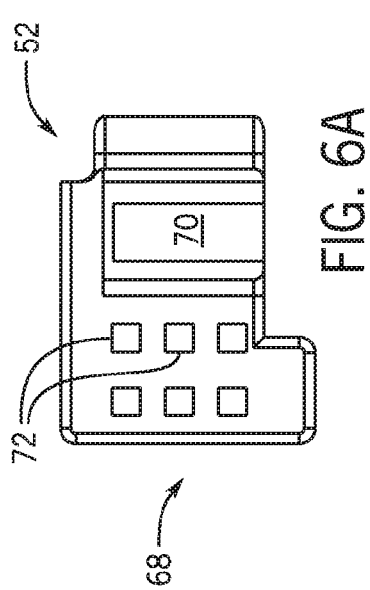
FIG. 6A is a top view of a tracking beacon lower portion according to the present disclosure.
Figure 6D:
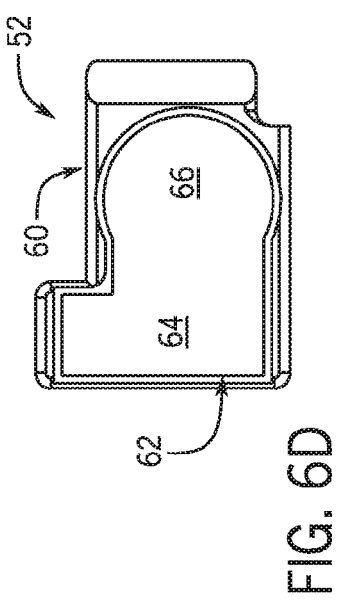
FIG. 6D is bottom plan view of the tracking beacon lower portion of FIG. 6A.
Figure 7C:
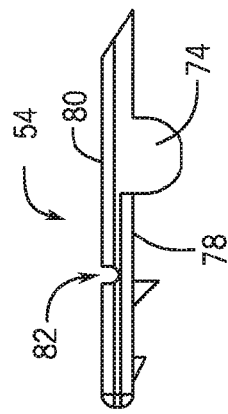
FIG. 7C is a side elevated view of the tracking beacon upper portion of FIG. 7A.
Figure 7A:
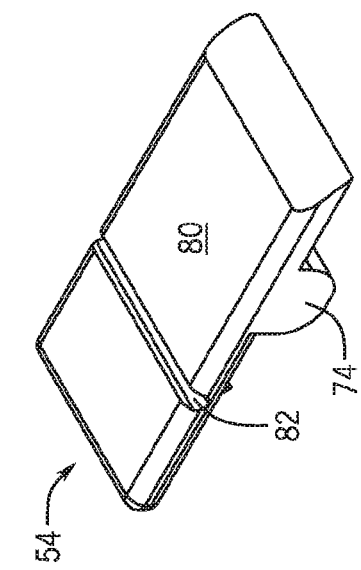
FIG. 7A is a top view of a tracking beacon upper portion according to present this disclosure.
Figure 7B:
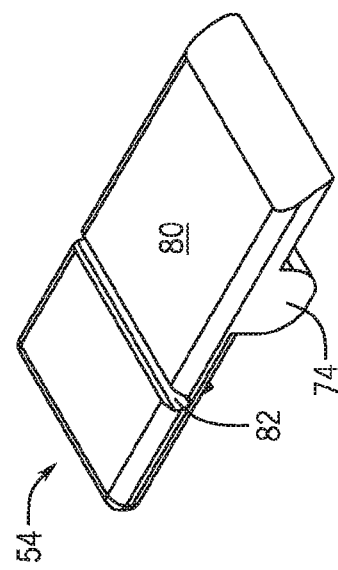
FIG. 7B is an isometric top view of the tracking beacon upper portion of FIG. 7A.
Figure 7E:
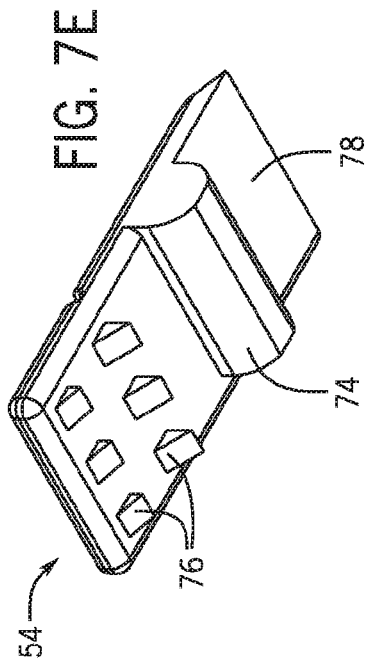
FIG. 7E is a bottom isometric view of the tracking beacons upper portion of FIG. 7A.
Figure 7D:
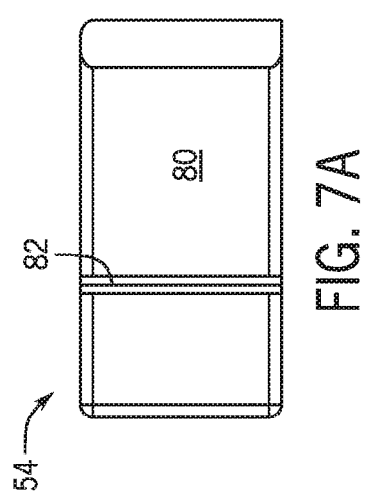
FIG. 7D is a bottom plan view of the tracking beacon upper portion of FIG. 7A.
Figure 8B:
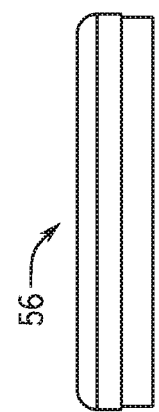
FIG. 8B is a side elevated view of the tracking beacon cover of FIG. 8A.
Figure 8D:
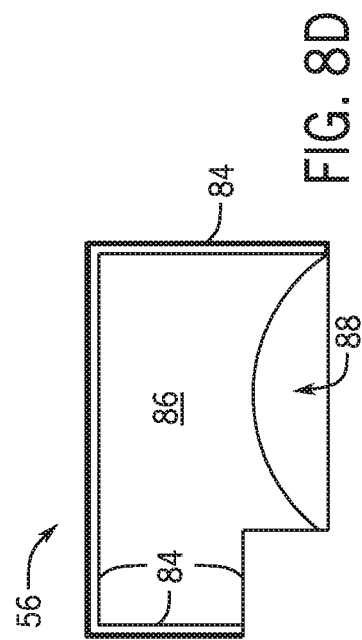
FIG. 8D is a bottom plan view of the tracking beacon cover of FIG. 8A.
Figure 8A:
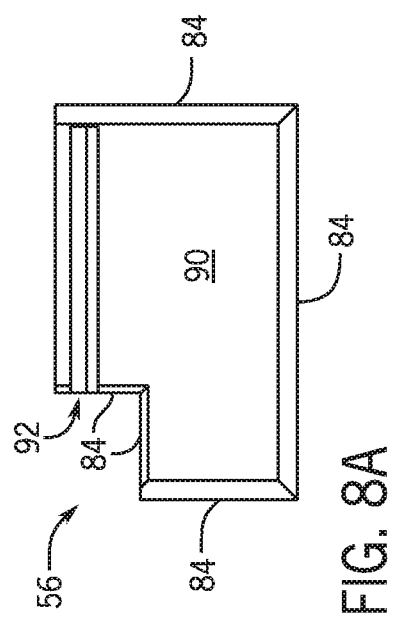
FIG. 8A is a top view of a tracking beacon cover according to the present disclosure.
Figure 8C:
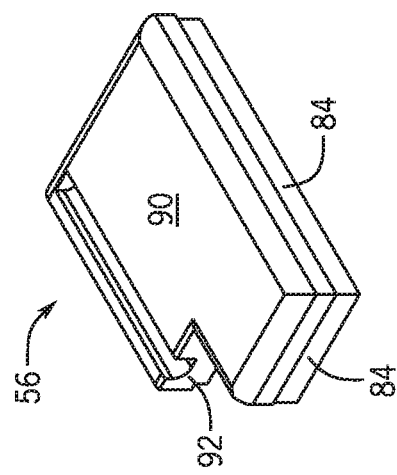
FIG. 8C is an isometric top view of the tracking beacon cover of FIG. 8A.
Figure 11C:
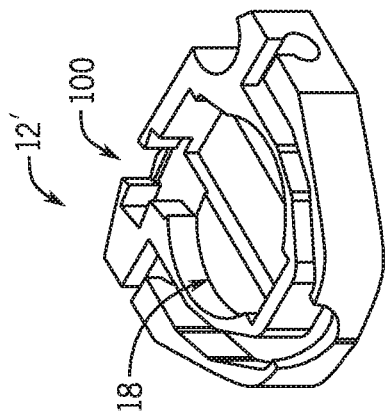
FIG. 11C is an isometric left view of the tracking beacon cover of FIG. 11A.
Figure 11F:
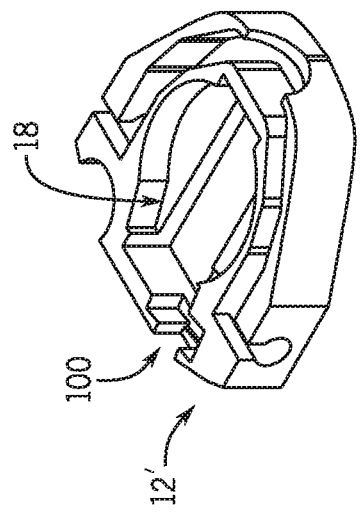
FIG. 11F is an isometric right view of the tracking beacons cover of FIG. 11A.
Figure 11B:
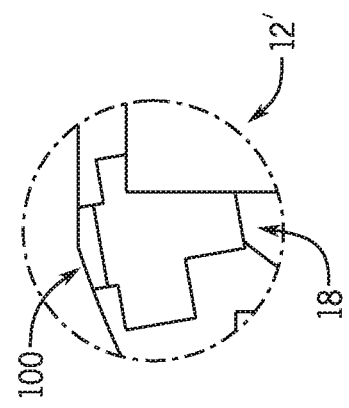
FIG. 11B is a detailed view of switch shown in FIG. 11A.
Figure 11E:
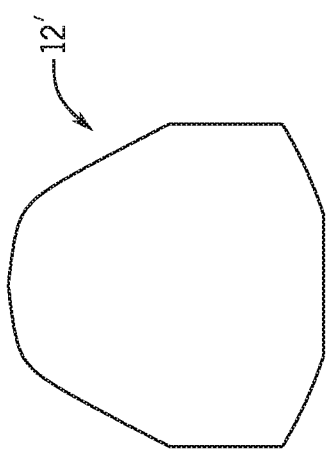
FIG. 11E is bottom plan view of the tracking beacon cover of FIG. 11A.
Figure 11A:
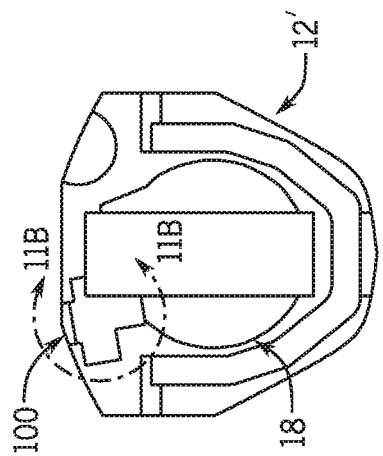
FIG. 11A is a top plan view of a tracking beacon cover according to the present disclosure.
Figure 11D:
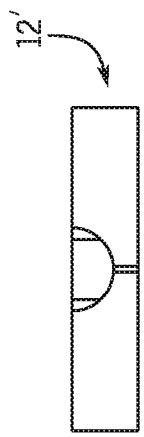
FIG. 11D is a side elevated view of the tracking beacon cover of FIG. 11A.
Figure 12B:
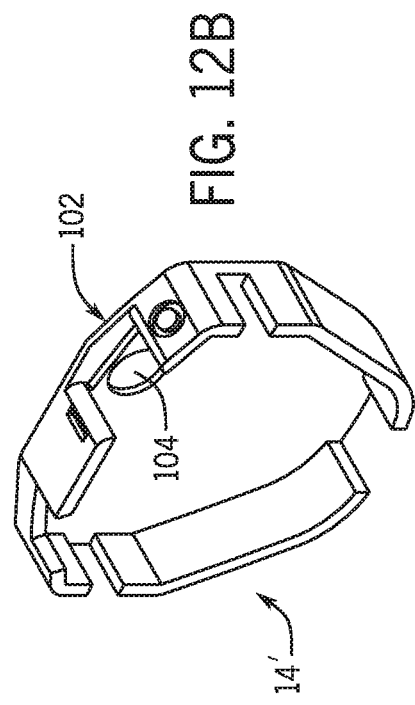
FIG. 12B is an isometric left view of the tracking beacon upper portion of FIG. 12A.
Figure 12D:
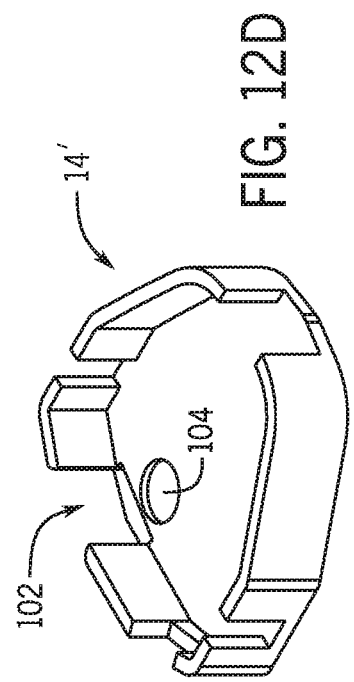
FIG. 12D is an isometric right view of the tracking beacons upper portion of FIG. 10A.
Figure 12A:
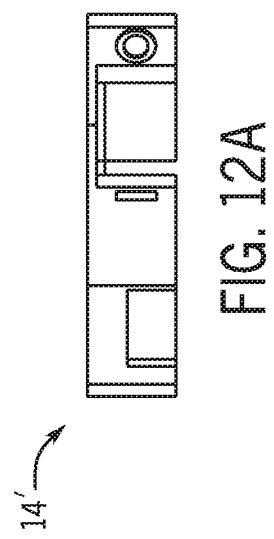
FIG. 12A is a top plan view of a tracking beacon cover according to the present disclosure.
Figure 12C:
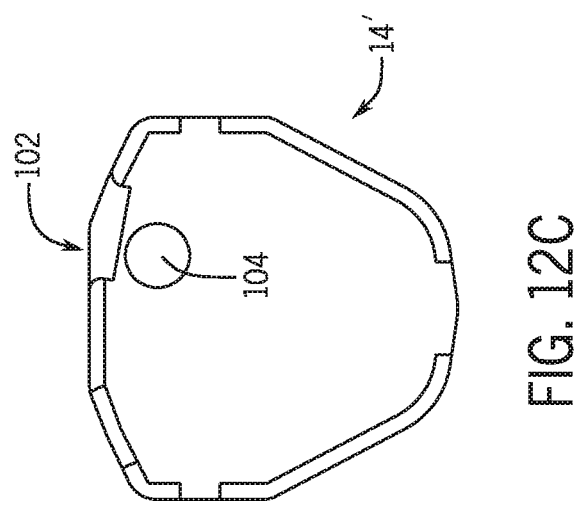
FIG. 12C is a side elevated view of the tracking beacon upper portion of FIG. 12A.
Figure 13C:
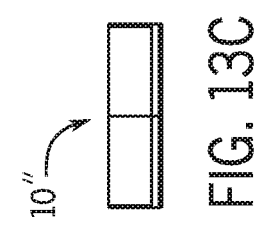
FIG. 13C is a top elevated view of the tracking beacon upper portion of FIG. 13A.
Figure 13B:
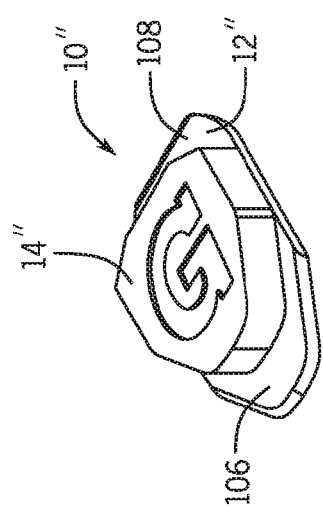
FIG. 13B is a right isometric view of the tracking beacons upper portion of FIG. 13A.
Figure 13A:
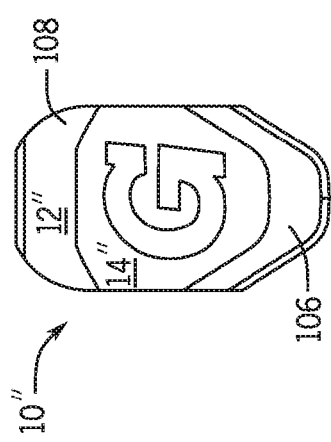
FIG. 13A is a top plan view of a tracking beacon according to the present disclosure.
Figure 13F:
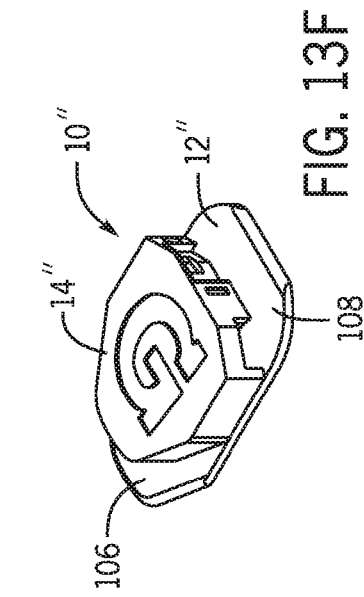
FIG. 13F is a left isometric view of the tracking beacons upper portion of FIG. 13A.
Figure 13E:
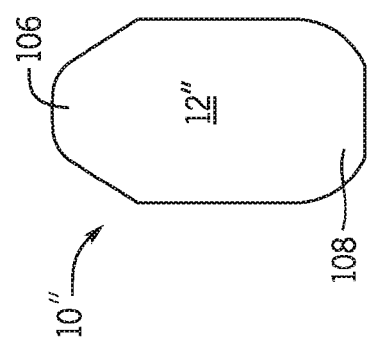
FIG. 13E is a bottom plan view of a tracking beacon according to the present disclosure.
Figure 13D:
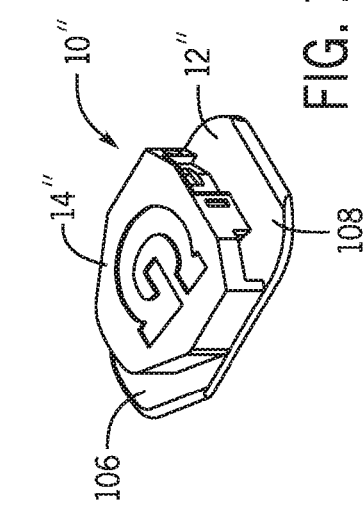
FIG. 13D is a side elevated view of the tracking beacon upper portion of FIG. 13A.
Figure 14C:
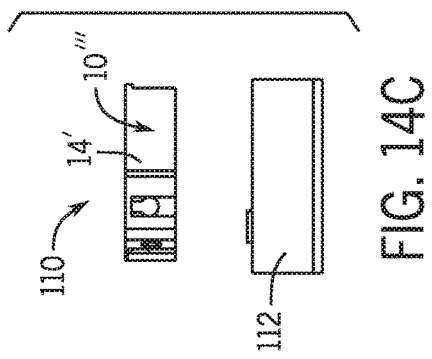
FIG. 14C is a right side elevated view of the tracking beacon storage and charging system of FIG. 14A.
Figure 14B:
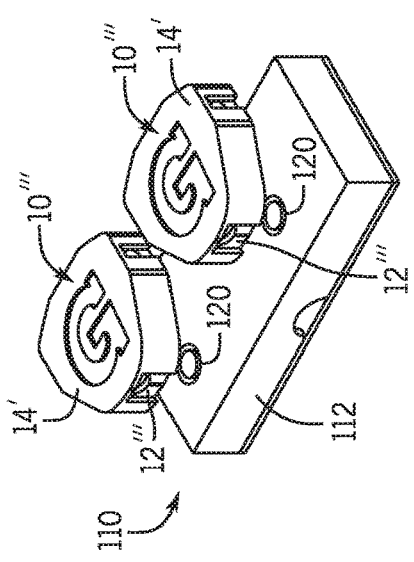
FIG. 14B is a right isometric view of the tracking beacon storage and charging system of FIG. 14A.
Figure 14A:
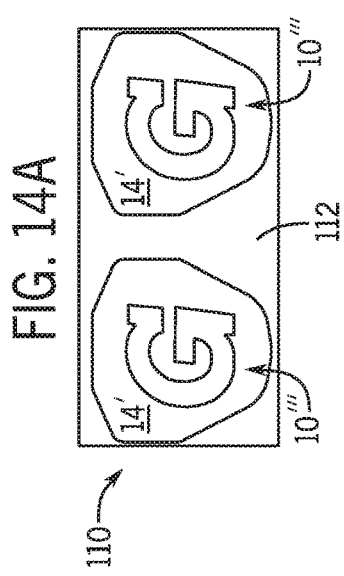
FIG. 14A is a top plan view of a tracking beacon storage and charging system according to the present disclosure.
Figure 14E:
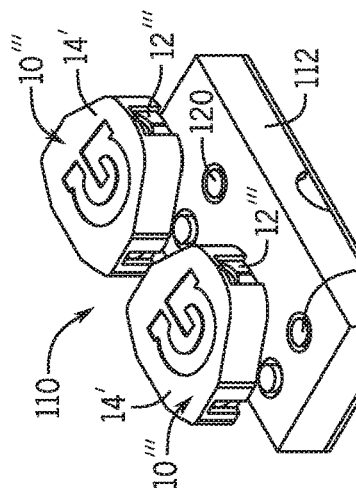
FIG. 14E is a left isometric view of a tracking beacon storage and charging system of FIG. 14A.
Figure 14D:
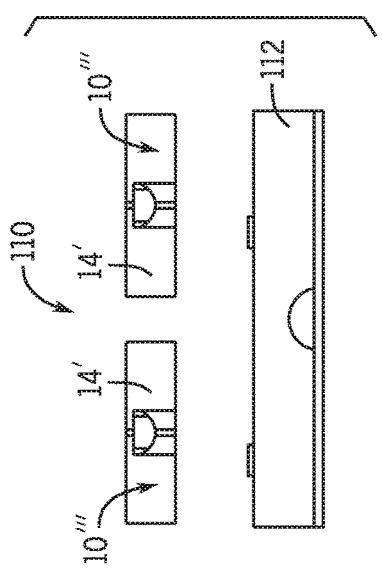
FIG. 14D is a front side elevated view of the tracking beacon storage and charging system of FIG. 14A.
Figure 16A:
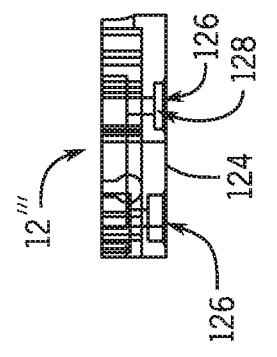
FIG. 16A is a top plan view of a tracking beacon charging rack according to the present disclosure.
Figure 16B:
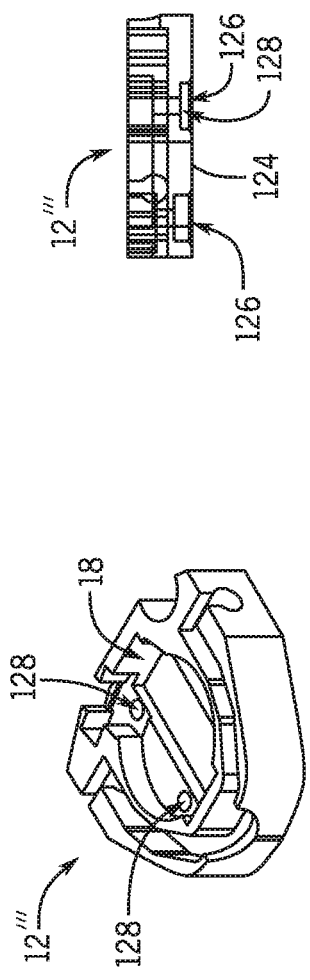
FIG. 16B is a left isometric view of the tracking beacon charging rack of FIG. 16A.
Figure 16C:
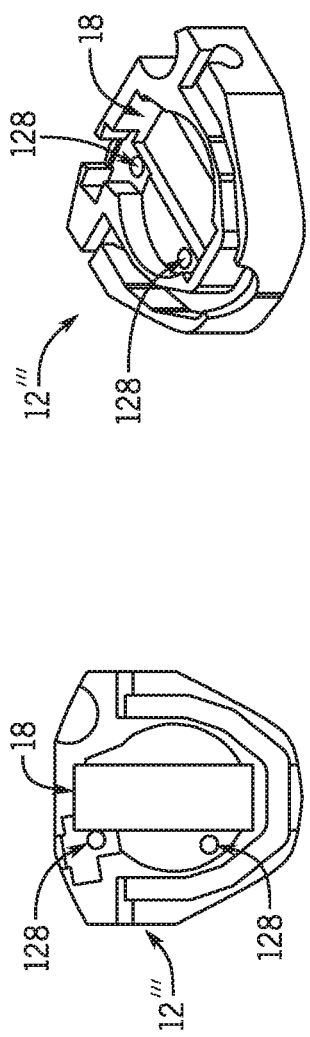
FIG. 16C is a top plan view of the tracking beacon charging rack of FIG. 16A.
Figure 16D:
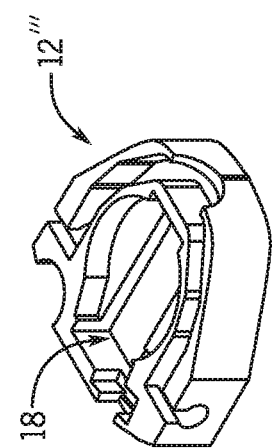
FIG. 16D is a bottom plan view of the tracking beacon charging rack of FIG. 16A.
Figure 16E:
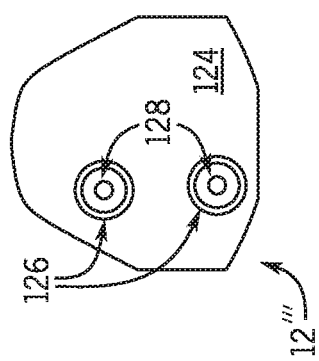
FIG. 16E is a rear elevated view of the tracking beacon charging rack of FIG. 16A.
Figure 16F:
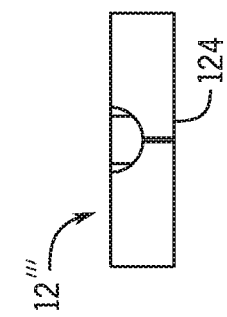
FIG. 16F is a right isometric view of the tracking beacon charging rack of FIG. 16A.

Turning to FIG. 1, an exemplary PPE tracking system 101, a computing system specially adapted to the methods of this disclosure, is comprised of a plurality of processing devices 22/68 linked via a network 11, such as a wide area network or the Internet, is illustrated. Processing devices 23, illustrated in the exemplary form of a device having specialized computer components, are provided with executable instructions to, for example, track the identity and location of a plurality of tracking beacon mounts 10 etc. Generally, the computer executable instructions reside in program modules which may include routines, programs, objects, components, data structures, etc. that perform particular tasks or implement particular abstract data types. Accordingly, those skilled in the art will appreciate that a processing device 21 may be embodied in any device having the ability to execute instructions such as, by way of example, a personal computer, mainframe computer, personal-digital assistant ("PDA"), cellular or smart telephone, tablet computer, or the like. Furthermore, while described and illustrated in the context of discrete processing devices 21, those skilled in the art will also appreciate that the various tasks described hereinafter may be practiced in a distributed or cloud-like environment having multiple processing devices linked via a local or wide-area network whereby the executable instructions, required data, etc. may be associated with and/or executed by one or more of multiple processing devices.

It will also be appreciated that, in the case of a user and/or the current location not having the ability to access to the Internet, a further device having all data and logic could communicate with the User's Computing Device via BlueTooth or any other protocol that makes sense to accomplish the various goals set forth herein.

For performing the various tasks in accordance with the executable instructions, a processing device 21 preferably includes a processing unit 23 and a system memory 25 which may be linked via a bus 27. Without limitation, the bus 27 may be a memory bus, a peripheral bus, and/or a local bus using any of a variety of bus architectures. As needed for any particular purpose, the system memory 25 may include read only memory (ROM) 29 and/or random access memory (RAM) 31. Additional, external memory devices may also be made accessible to the processing device 21 by means of, for example, a hard disk drive interface 33, a magnetic disk drive interface 35, and/or an optical disk drive interface 37. As will be understood, these devices, which would be linked to the system bus 27, respectively allow for reading from and writing to a hard disk 38, reading from or writing to a removable magnetic disk 41, and for reading from or writing to a removable optical disk 43, such as a CD/DVD ROM or other optical media. The drive interfaces and their associated non-transient, computer-readable media allow for the non-volatile storage of computer readable instructions, data structures, program modules and other data for the processing device 21. Those skilled in the art will further appreciate that other types of non-transient, computer readable media that can store data may be used for this same purpose. Examples of such media devices include, but are not limited to, magnetic cassettes, flash memory cards, digital video-disks, Bernoulli cartridges, random access memories, nano-drives, memory sticks, and other read/write and/or read-only memories.

A number of program modules may be stored in one or more of the memory/media devices. For example, a basic input/output system (BIOS) 44, containing the basic routines that help to transfer information between elements within the processing device 22, such as during start-up, may be stored in ROM 29. Similarly, the RAM 31, hard drive 38, and/or peripheral memory devices may be used to store computer executable instructions comprising an operating system 47, one or more applications programs 49 (such as a Web browser, electronic document viewer/editor, etc.), other program modules 51 (such as program extensions), and/or program data 53. Still further, any such computer-executable instructions may be downloaded to one or more of the computing devices as needed, for example, via a network connection.

A user may interact with the various application programs, etc. of a processing device 21, e.g., to enter commands and information into the processing device 21, through input devices such as a touch screen or keyboard 55 and/or a pointing device 57. This allows the user to enter information into or select options or settings relating to the tracking beacon mounts 10 described below. While not illustrated, other input devices may include a variety of sensors, a microphone, a joystick, a game pad, a scanner, a camera, a gesture recognizing device, etc. These and other input devices would typically be connected to the processing unit 23 by means of an interface 59 which, in turn, would be coupled to the bus 27. Input devices may be connected to the processor 23 using interfaces such as, for example, a parallel port, game port, firewire, or a universal serial bus (USB). To view information from the processing device 21, a monitor 61 or other type of display device may also be connected to the bus 27 via an interface, such as a video adapter 63. In addition to the monitor 61, the processing device 21 may also include other peripheral output devices, not shown, such as speakers and printers.

A processing device 21 may also utilize logical connections to one or more remote processing devices, such as a server system 69 having one or more associated data repositories 68A in which is stored, for example, unique identifiers, item types, and user information. In this regard, while the server system 69 has been illustrated in the exemplary form of a computer, it will be appreciated that the server system 69 may, like processing device 21, be any type of device having processing capabilities. Again, it will be appreciated that the server system 69 need not be implemented as a single device but may be implemented in a manner such that the tasks performed by the server system 69 and/or data needed for performance of such tasks are distributed to a plurality of processing devices linked through a communication network, e.g., implemented in the cloud. Additionally, the server system 68 may have logical connections to other devices 21' and 21" via the network 11 as needed and, via such connections, will be associated with data repositories and memories that are associated with such other devices 21' and 21".

For performing tasks, e.g., to track and communicate with a plurality of a tracking beacon mounts 10, the server system 69 may include many or all of the elements described above relative to the processing device 21. By way of further example, the server system 69 includes executable instructions stored on a non-transient memory device for, among other things, identifying specific tracking beacon mounts 10, associating tracking beacon mounts 10, with unique users, and/or approximating location of the tracking beacon mount 10. Communications between the processing device 21 and the server system 69 may be exchanged via a further processing device, such as a network router, that is responsible for network routing. Communications with the network router may be performed via a network interface component 73. Thus, within such a networked environment, e.g., the Internet, World Wide Web, or other like type of wired or wireless network, it will be appreciated that program modules depicted relative to the processing device 21, or portions thereof, may be stored in the memory storage device(s) of the server system 69.

Referring now to the figures, and more particularly to FIGS. 2A-4E, an example tracking beacon mount 10 is illustrated that includes a base 12 and a lid 14. The example tracking beacon mount 10 is used to secure a tracking beacon to a strap, such as the strap of a pair of safety goggles, for example. Accordingly, the tracking beacon mount 10 may be referred to in this disclosure as a strap mount 10'.

The tracking beacon (not shown) in the example shown is a low energy Bluetooth transmitter (version 4.0 or later) configured to communicate with the PPE tracking system 101 and send at least a unique identifier. In some examples, the tracking beacon is a two way transmitter capable of communicating and confirming messages regarding data such as: the item type that the beacon is attached to, battery charge remaining, and any other pertinent information. One of ordinary skill would appreciate that the tracking beacon any device suited to short range transmission of information such as a scannable visual pattern like a barcode or QR code, an RFID tag, or a WiFi or radio transmitter.

The example base 12 includes a housing 16 having a beacon cavity 18 configured in size and shape to receive a tracking beacon (not shown), which may include a printed circuit board (PCB) and a battery, or any other suitable beacon as desired. More specifically, the example beacon cavity 18 includes a rectangular bottom portion 20 in which a PCB may be disposed and an annular top portion 22 in which a battery may be disposed. Accordingly, the battery of a tracking beacon may be placed on top of a PCB of the beacon in a space-efficient configuration.

The housing 16 further includes a strap channel 24 configured in size and shape to receive a strap of a piece of personal protection equipment. In this example, the strap channel 24 defines a tortuous path. In particular, the strap channel 24 extends from a first circular aperture 26 in the base housing to a second circular aperture 28 in the base housing 16 and extends along a curved path generally about the beacon cavity 18. The strap channel 24 additionally includes a right-angle bend 30 proximate each aperture 26, 28, such that a strap inserted in the strap channel 24 through the apertures 26, 28 is held in place at the bends 30 and does not inadvertently slip through the strap channel 24, but may be moved through the strap channel 24 if desired. The housing 16 also includes an entry opening 32 through which a user may access a strap disposed in the strap channel 24. The example entry opening 32 is larger than the example apertures 26, 28. The example strap channel 24 is separated from the beacon cavity 18 by an intervening wall 34.

The lid 14 includes a top plate 40 and a plurality of side walls 42 and is configured in size and shape for interference-fit over the base 12, such that a strap and a tracking beacon in the base 12 are both securely disposed between the base 12 and the lid top plate 40. Accordingly, the example lid 14 has the same general profile as the example base 12. The side walls 42 define two ports 44 positioned to fit over the apertures 26, 28 in the base 12, such that a strap extends through both the ports 44 in the lid 14 and the apertures 26, 28 in the base 12.

As noted above, the lid 14 and base 12 are configured for interference-fit with each other so as to cooperatively secure a tracking beacon to a strap. The lid 14 and base 12 are provided with respective notches—a first notch 46 on the base, and a second notch 48 on the lid—to enable a user to separate the lid 14 from the base 12 to, e.g., remove or insert a tracking beacon or strap. It will be appreciated by one of ordinary skill in the art that the lid 14 and base 12 may be coupled via any suitable attachment mechanism including, for instance, welding, adhesion, snap-fit, or other suitable permanent or semi-permanent connection.

The example strap mount 10' provides numerous advantages. The strap mount 10' allows a beacon to be secured to a variety of unique PPE items which may have little surface area to mount to, on which surface mounting may disrupt their use, or on which surface mounting would damage the PPE. The two-piece (i.e., base 12 and lid 14) design enables the strap mount 10' to securely wrap around and enclose a strap. The complementary notches 46, 48 in the base 12 and the lid 14 allow a user to easily pry apart the base 12 and the lid 14, but the base 12 and the lid 14 are prevented from accidentally separating by interference-fit. The two-piece design allows the strap mount 10' to be effectively reused numerous times, such that it can be repeatedly secured to and removed from various different PPE straps. The design of the strap channel 24 results in a resistance level, for a range of strap diameters, which is tight enough to prevent accidental slipping, but loose enough to allow the user to easily adjust the position of the mount 10 on a strap. The design of the strap channel 24, in conjunction with the location of the battery's center of mass in the beacon cavity 18, enables the beacon to lie flat, in an aesthetically pleasing manner, in a wide variety of uses. The design of the strap channel 24 enables a strap to be easily set into the housing 16 such that the strap is free to slide in the strap channel 24 but cannot be accidentally removed from the housing 16. This design greatly increases ease of assembly when securing the mount 10 to the strap. The design of the strap channel 24, with one large opening 32 and two small exit apertures 26, 28, allows the user to install the strap in a desired orientation. This feature further contributes to the mount's 10 ease of assembly. The battery and circuit board tightly fit into the base 12 of the mount 10 such that the base 12 and lid 14 can be freely interchanged, because the components are only stored in one half of the mount 10.

FIGS. 5A-9D illustrate an example tracking beacon mount 50. The example mount 50 of FIGS. 5A-9D may be used to secure a tracking beacon to a collar, boot, or other PPE by clamping on to the PPE. Accordingly, the example mount 50 may be referred to as a clamp mount 50.

The example clamp mount 50 includes an upper clamp portion 52, a lower clamp portion 54, a PCB cap 56, and a battery cap 58. The PCB cap 56 and battery cap 58 are separably coupled to the upper clamp portion 52, and the upper clamp portion 52 is coupled to and interacts with the lower clamp portion 54 so as to operatively clamp to secure the PCB cap 56, the battery cap 58, and the portions of a tracking beacon contained therein, to any item of the PPE.

As shown in FIG. 5, the example upper clamp portion 52 is generally polygonal and includes a first side 60 configured to receive a PCB and a battery, and to be coupled with the PCB cap 56 and the battery cap 58. The first side 60 includes a beacon recess 62 having a first portion 64 configured in size and shape to receive a PCB, and a second portion 66 configured in size and shape to receive a battery.

The upper clamp portion 52 further includes a second side 68, opposite the first side 60, configured to be coupled with the lower clamp portion 54. The second side 68 includes a semi-annular pivot recess 70 configured to receive a corresponding annular or cylindrical structure on the lower clamp portion 54 to enable the upper and lower clamp portions 52, 54 to pivot with respect to each other. The second 68 side also includes a plurality of recessed ports 72 configured to receive corresponding teeth on the lower clamp portion 54. For clarity of illustration, not all recessed ports 72 are designated in the figures.

As shown in FIG. 7A-7E, the example lower clamp portion 54 is generally rectangular and includes a cylindrical pivot shaft 74 and a plurality of teeth 76 on a first side 78. For clarity of illustration, not all teeth 76 are designated in the figures. The pivot shaft 74 is configured to interact with the semi-annular pivot recess 70 on the upper clamp portion 52, and the teeth 76 are configured to align with the recessed ports 72 on the upper clamp portion 52 and to provide increased friction between the clamp mount 54 and the PPE when in use. A second side 80 of the lower clamp portion 54, opposite the first side 78, includes a channel 82 configured to receive a first portion of a wire form spring (not shown) that provides the force that causes the upper and lower clamp portions 52, 54 to clamp together.

The example PCB cap 56, shown in isolation in FIG. 8A-D, is configured in size and shape to fit over a PCB disposed in the beacon recess 62 of the upper clamp portion 52. The PCB cap 56 includes walls 84 configured for interference-fit with the beacon recess 62, which walls 84 surround a cavity 86 that receives the PCB of a tracking beacon when the clamp mount 50 is assembled with a beacon. The PCB cap 56 cavity also includes a groove 88 in which a portion of the battery sits when the mount is assembled with a beacon. In addition, a top surface 90 of the PCB cap 56 includes a channel 92 configured to receive a second portion of the wire form spring (not shown) that provides the force that causes the upper and lower clamp portions 52, 54 to clamp to the PPE.

The example battery cap 58, shown in isolation in FIG. 9A-D, is configured in size and shape to fit over a battery disposed in the beacon recess 62 of the upper clamp portion 52. The battery cap 58 includes a curved wall 94 configured for interference-fit with the beacon recess 62, which wall 94 surrounds a cavity 96 that receives the battery of a tracking beacon when the clamp mount 50 is assembled with a beacon. The battery cap 58 further includes a "flat" side 98 that adjoins the PCB cap 56 in the assembled clamp mount.

To assemble the clamp mount 50, the upper clamp portion 52 is placed on the lower clamp portion 54 with the pivot shaft 74 in the semi-annular pivot recess 70 and the teeth 76 in the plurality of recessed ports 72. A PCB and a battery (collectively comprising a tracking beacon) are placed in the beacon recess 62 of the upper clamp portion 52. The battery cap 58 and PCB cap 56 are placed over the battery and PCB and interference-fit into the beacon recess 62 of the upper clamp portion 52. A wire form spring is then placed over the assembly, with a first portion in the groove 82 on the lower clamp portion 54, and a second portion in the groove 92 on the PCB cap. The clamp mount 50 may thereafter be used to secure the tracking beacon to the PPE or other devices and objects. Alternatively, the lower clamp portion 54 and wire form spring may be eliminated from the assembly, and the upper clamp portion 52 may be coupled directly to the PPE, such as with adhesive, to secure the tracking beacon to the PPE.

The example clamp mount 50 may provide numerous advantages. For instance, the clamp mount 50 enables a beacon to be easily attached to the edge of PPE. The clamp mount 50 can be used with a single hand, rather than requiring the use of both hands. The clamp mount 50 can be effectively reused such that it can be repeatedly attached and detached to the edge of PPE. The clamp mount can be easily disassembled and reassembled due to the pointed lever arms which enable the spring to easily slide around the two clamp halves 52, 54 and into position. The clamp mount 50 has teeth 76 to grip onto the fabric based PPE and inhibit accidental removal. The clamp mount 50 has one cap 56 for the circuit board and one cap 58 for the battery, so that the battery can be removed without disturbing the circuit board. The wire form spring helps retain the circuit board cap 56 by resting atop it when the clamp 50 is fully assembled. The wire form spring allows the two halves 52, 54 of the clamp mount 50 to be easily slid apart. This allows the upper half 52, housing the circuit board and battery, to be secured to the surface of the PPE with an adhesive. By separating the two halves 52, 54, the mount 50 can be mounted to the surface without excessive bulk. The lever arms of the clamp are long enough so that it can be easily opened and closed by the user, but short enough to inhibit accidental removal from the PPE.

In an example, the tracking beacon may include a power switch. FIGS. 10A-12D illustrate an example strap mount 10" that accommodates a power switch. The example strap mount 10" of FIGS. 10A-12D is similar to the example strap mount 10' of FIGS. 2A-4E. Except as explicitly described differently, the features of the example strap mount 10' of FIGS. 2A-4E are also features incorporated into the example strap mount 10" of FIGS. 10A-12D.

Referring to FIGS. 10A-12D, the example strap mount 10" includes a lid 14' and a base 12'. The base includes a switch port 100 which provides a passageway from an exterior of the base 12' to the beacon cavity 18 of the base 12'. The lid 14' includes a corresponding switch port 102 positioned to overlay the switch port 100 of the base 12' so as to allow access to a switch, such as a power switch, on a tracking beacon disposed inside the example strap mount 10". The switch port 102 has filleted or chamfered edges to provide comfortable access to the switch. The lid 14' further includes a depression 104 in its interior surface that allows for excursion of raised components of the switch. The features of the example strap mount 10" that accommodate a switch may also be provided on another mount, such as the clamp mount 50, in an example.

A tracking beacon having a switch, such as a power switch, and consequently a mount 10' that accommodates such a tracking beacon, may offer numerous advantages. A power switch enables battery conservation. A power switch may also be used for other purposes such as, for example, to send out a help request if the switch is modulated in a particular sequence. Due to the design of the example mount 10', the power switch can be easily accessed and used without disturbing beacon function or form. And, also due to the design of the mount 10', the power switch is resistant to accidental triggering (e.g., the power switch won't turn off if the beacon rubs against something).

FIG. 13A-F illustrates an example tracking beacon mount 10" that may be used to secure a beacon to shoelaces and, accordingly, is referred to herein as a shoelace mount 10'''. The example shoelace mount 10" includes a lid 14" and a base 12". The example shoelace mount 10" is similar to the example strap mount 10" of FIGS. 10A-12D. Except as explicitly described differently, the features of the example strap mount 10" of FIGS. 10A-12D (including those features incorporated from the example strap mount 10' of FIGS. 2A-4E) are also features of the example shoelace mount 10" of FIG. 13A-F.

The example base 12" includes front and rear flanges 106, 108 that extend beyond the profile of the lid 14". The flanges 106, 108 can be used to insert and hold the shoelace mount 10''' under the laces of a shoe or boot. The edges of the flanges 106, 108 (e.g., the front and rear edges) are filleted or chamfered, and the flanges 106, 108 are curved, to allow for easy insertion under laces. Because a strap does not need to be inserted through the lid 14", the lid 14" lacks ports (i.e., the ports 44 of FIG. 4A) for the passage of such a strap. The lid 14" and base 12" are flush with each other on the side of the mount 10''', so as to prevent accidental snagging and corresponding separation of the base 12" from the lid 14".

The example shoelace mount 10" may provide numerous advantages. The shoelace mount 10" allows a tracking beacon to easily be secured to a laced shoe. The beacon can be slid into and out of the laces for attachment and detachment to the footwear without damaging the shoe. The slim flanges 106, 108 protruding from the main base 12" can be slid under the shoe's laces to secure the beacon in place. The rounded edges on the flanges 106, 108 ease the beacon's attachment and detachment from the shoe.

A tracking beacon as described in the present disclosure includes a battery (though the mounts 10, 10', 10", 50 of the present disclosure may also be used to secure devices without batteries). Accordingly, it is beneficial to provide a mount and charger that enable a tracking beacon to be charged and stored while not in use.

FIGS. 14A-16F illustrate an example tracking beacon storage and charging system 110 that includes an example charging rack 112 and two example strap mounts 10''''. The example strap mount 10" illustrated in the system of FIGS. 14A-16F is similar to the example strap mount 10" of FIGS. 10A-12D. Except as explicitly described differently, the features of the example strap mount 10" of FIGS. 10A-12D (including those features incorporated from the example strap mount 10' of FIGS. 2A-4E) are also features of the example strap mount 10" in the system of FIGS. 14A-16F.

The charging rack 112 includes a body 114 having a cavity 116 configured in size and shape to receive charging electronics such as, for example, a power converter and leads from the converter. The charging rack 112 further includes two or more (the illustrated example in FIGS. 14A-16F includes four) magnet ports 118 and electrically-conductive magnets 120 disposed in the magnet ports 118. For clarity of illustration, not all magnet ports 118 and magnets 120 are designated in the figures. The magnet ports 118 of the example charging rack 112 include chamfered or filleted edges to enable easy insertion of the magnets 120. The charging rack 112 further includes apertures 122 that provide a passageway for electrical wires from the charging electronics to the magnets 120. The magnets 120 are operative to both conduct electrical current to charge a tracking beacon and to magnetically secure the tracking beacon to the charging rack 112. The magnets 120 are disposed in opposed-polarity pairs to serve as charging terminals. Each magnet 120 in the example charging rack 112 is offset in height from its opposite-polarity pair magnet 120 to accommodate the same arrangement in the charging terminals in the strap mount 10", as will be explained below.

As shown in FIG. 16A-F, the example strap mount 10"" includes a base 12''' and a lid 14'. The example base includes 12''', on a bottom surface 124, two magnet ports 126 and electrically-conductive magnets (not shown) in the magnet ports 126. The example base 12''' further includes apertures 128 for electrical wiring from the magnets to a battery disposed in the beacon cavity 18 of the base 12'''. The magnets are operative to both conduct electrical current to charge the tracking beacon and to magnetically secure the tracking beacon to the charging rack 112. The magnets are disposed in opposed-polarity pairs to serve as charging terminals. Each magnet in the example strap mount 10"" is offset in height from its opposite-polarity pair magnet to prevent accidental battery discharge if the strap mount 10'''' is placed on a flat conductive surface.

The example tracking beacon storage and charging system 110 may provide various advantages. The system 110 allows a beacon with a rechargeable battery to be stored and recharged in one location. Via the use of magnetic leads 120, the beacons can simultaneously be stored and charged, helping to mitigate the problems surrounding beacon battery life. The magnetic leads 120 allow multiple beacons to be stored and organized on one rack 112. The magnetic leads 120 carry a current to charge beacons' batteries as they are stored on the rack 112. The reversed polarity of any pair of leads 120 prevents misalignment of the beacon on the rack 112 as it can only be mounted in one configuration. This system prevents battery draining which would occur when mounted in an improper orientation. The offset of the magnets in the mount 10''' inhibits both magnets from being in contact with a metal surface simultaneously. This means a circuit cannot be completed across the magnetic leads and thus the battery cannot be accidentally drained.

In operation, the tracking beacon mount 10, is attached to an item of a user. The user uses any user interface device, such as touch screen or keyboard 54 and/or a pointing device 56 to associate the unique identifier of the tracking beacon mount 10 with a type of the item upon which the tracking beacon mount 10 is placed. When the PPE tracking system 101 detects a signal from the tracking beacon mount 10 with at least one proximity sensor, the system 101 knows a relative location of the tracking beacon mount.

The proximity sensor in this example is a Bluetooth transmitter, at least a part of the network interface component 73, capable of communicating with the Bluetooth tracking beacon. One of ordinary skill in the art would appreciate that the proximity sensor could be any complimentary receiver to the transmitter in the tracking beacon mount 10 including as a sensor that is a part of the peripheral interface 59. In some examples, the proximity sensor can confirm that the tracking beacon mount 10 is within the range of its transmitter, This allows the relative location to be approximated from a known location of the sensor, if not an exact distance or direction. In other examples, the proximity sensor is capable of more accurately determining the relative location of the user by using range finding, triangulation, or other suitable techniques.

The PPE tracking system 101 within system memory 24 contains a set of states pertaining to required items needed at the location of the proximity sensor. These states are programmed before use of the PPE tracking system 101 to reflect the types of items needed by a user for reasons such as safety and productivity. The PPE tracking system 101 compares the state containing a required item type with the state containing the type of item the tracking beacon mount 10 is placed on. The results of this comparison are used to create a message to the user on monitor 60 or any other notification system. This message can be for, example, a warning, confirmation, details on inventory remaining, or confirmation that a user has started their shift. In some scenarios, the user has a tracking beacon mount 10 installed on or as part of their identification card so the system 101 may detect users without any monitored PPE being worn.

For example, the PPE tracking system 101 may be located in at the entrance to a construction zone. Here, the system 101 is checking for a signal with a unique identifier tracking beacon mount 10 associated with a hard hat. When the correct type of item is identified, a warning about the need to wear the helmet on the monitor 60 is changed to a confirmation that the user is permitted to enter the construction zone.

Other examples may include tracking beacon mounts 10 installed on tools needed to complete a job and monitor the user's location. For example, a user may be assigned to repair the inside of a boiler at a work site. Tracking beacon mounts 10 are installed on this user's identification card, welding mask, and welding gear. The system 101 will recognize the user via his identification and be programmed with what tools and PPE that he needs by a safety expert or his supervisor. An interactive display, such as the monitor 60, will communicate these required items to the user and confirm that all the associated beacons are detected before allowing the user to leave the equipment storage room. Another proximity sensor of the PPE tracking system 101 can be used to check that all the tools are brought with the user to the work site. The PPE tracking system 101 may also be connected to the boiler's control system and designed to prevent the system from turning on while any tracking beacon mount 10 is still detected by the proximity sensor at the work site. Alternatively, the proximity sensor in the equipment storage room could be used to determine when the tools and user are safely away from the repaired boiler and allow the boiler to be restarted once everything has been returned.

In some examples, the tracking beacons mount will include a display, vibration inducing motor, LED light, or other suitable device to communicate information to the user. In this example, the tracking beacon mount 10 and the PPE tracking system 101 are in communication via the tracking beacon and proximity sensor respectively. The warnings, notifications, and other messages that could have been sent to the user via output devices, such as monitor 60, could also be sent to the tracking beacon mount 10. For example, the PPE tracking system 101 may cause the LED on the tracking beacon mount 10 to light up in the color red or cause the vibration inducing motor to activate in order to warn the user that not enough of the required items have been detected by the proximity sensor.

Although the mounts 10, 10', 10'', 10''', 50 of the present disclosure have been described with respect to tracking beacons for personal protection equipment, the present disclosure is not so limited. Instead, the example mounts 10, 10', 10'', 10''', 50 of this disclosure may be used to secure tracking beacons to objects other than personal protection equipment. Furthermore, mounts consistent with this disclosure may have different dimensions and arrangements than those explicitly shown and described herein, with such dimensions and arrangements selected as appropriate for a desired tracking beacon or object to which the beacon is to be secured.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents.

What is claimed is:

1. A radio frequency (RF) monitoring system, comprising:
   a housing comprising:
      a base forming a cavity;
      a RF transmitter, disposed entirety within the cavity formed in the base, operable to transmit a monitoring signal having a unique identifier;

a battery, disposed entirely within the cavity formed in the base, operable to provide power to the transmitter; and a cover, removeably attached to the base over the cavity, for enclosing the cavity;

a proximity sensor operable to receive the monitoring signal from the transmitter; and a controller in communication with the proximity sensor operable to generate an output indicative of the proximity sensor receiving the monitoring signal from the transmitter;

wherein the base and the cover cooperate to form a strap channel within the housing and wherein the strap channel defines a curved, tortuous path that extends between a first opening formed in the housing and a second opening formed in the housing for moveably securing the housing to a strap and wherein the curved, tortuous path defined by the strap channel includes an entry opening formed in the housing and a ninety degree turn near a respective one of the first opening and the second opening.

2. The RF monitoring system as recited in claim 1, wherein the battery comprises a rechargeable battery.

3. A radio frequency (RF) monitoring system, comprising:
a housing comprising:
   an first clamp portion forming a cavity;
   a RF transmitter, disposed within a first portion of the cavity formed in the first clamp portion, operable to transmit a monitoring signal having a unique identifier;
   a battery, disposed within a second portion of the cavity formed in the first clamp portion, operable to provide power to the transmitter;
   a cover having a first cover portion, removeably attached to the first clamp portion over the first portion of the cavity formed in the first clamp portion, and a second cover portion, removeably attached to the first clamp portion over the second portion of the cavity formed in the first clamp portion, for enclosing the cavity;

a second clamp portion pivotally coupled to the first clamp portion and moveable between a clamp closed position in which a first end of the first clamp portion is positioned adjacent to a first end of the second clamp portion and a clamp open position in which the first end of the first clamp portion is spaced from the first end of the second clamp portion; and a spring cooperable with the first clamp portion and the second clamp portion to bias the second clamp portion towards the clamp closed position;

a proximity sensor operable to receive the monitoring signal from the transmitter; and a controller in communication with the proximity sensor operable to generate an output indicative of the proximity sensor receiving the monitoring signal from the transmitter;

wherein a second end of the first clamp portion and a second end of the second clamp portion are arranged to receive a force for moving the first clamp portion and the second clamp portion between the clamp closed position and the clamp open position for removeably securing the housing to an article of clothing.

4. The RF monitoring system as recited in claim 3, wherein the first end of a one of the first clamp portion and second clamp portion has a plurality of projections and the first end of the other one of the first clamp portion and the second clamp portion has complementary indentations into which is received the plurality of projections.

5. The RF monitoring system as recited in claim 3, wherein the battery comprises a rechargeable battery.

* * * * *